April 15, 1924. 1,490,326

N. JOLEEN ET AL

ASSEMBLING APPARATUS FOR MANUFACTURED PRODUCTS

Filed Dec. 26, 1919 2 Sheets-Sheet 1

Inventors
Nels Joleen
John Burckhardt
By Parker & Carter Attys

April 15, 1924.
N. JOLEEN ET AL
1,490,326
ASSEMBLING APPARATUS FOR MANUFACTURED PRODUCTS
Filed Dec. 26, 1919
2 Sheets-Sheet 2
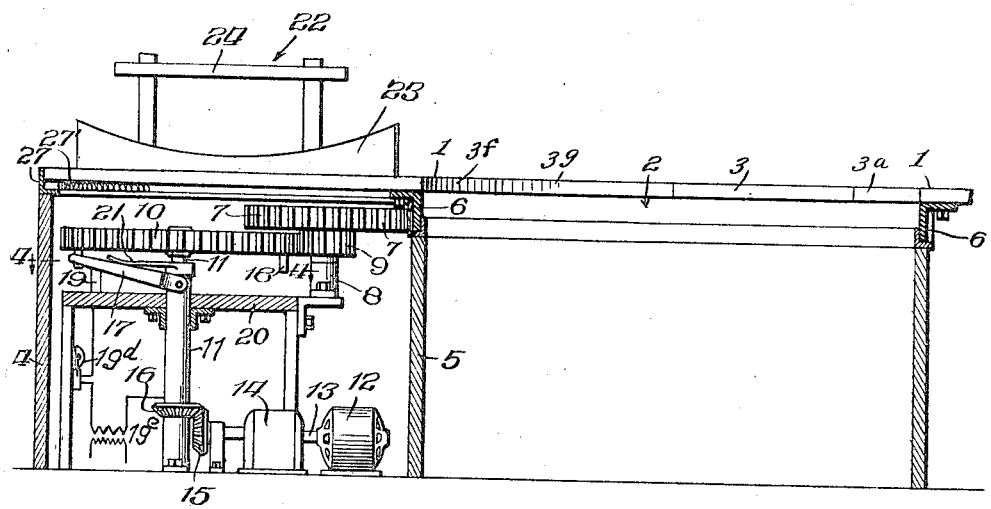
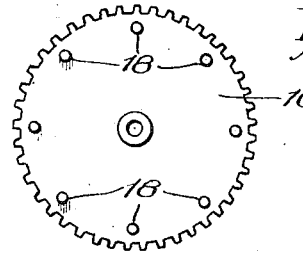
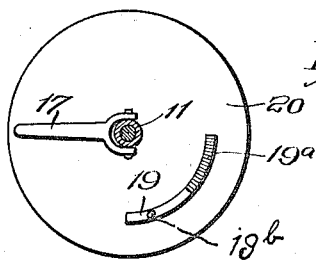
Inventors
Nels Joleen
John Burkhardt
By Parker & Carter Atty's Patented Apr. 15, 1924.

1,490,326

UNITED STATES PATENT OFFICE.

NELS JOLEEN AND JOHN BURKHARDT, OF CHICAGO, ILLINOIS.

ASSEMBLING APPARATUS FOR MANUFACTURED PRODUCTS.

Application filed December 26, 1919. Serial No. 347,584.

*To all whom it may concern:*

Be it known that we, NELS JOLEEN and JOHN BURKHARDT, citizens of the United States, residing at Chicago, in the county of Cook and State of Illinois, have invented certain new and useful Improvements in Assembling Apparatus for Manufactured Products, of which the following is a specification.

This invention relates to a new and useful improvement in assembling apparatus for manufactured products, and has for its object to provide a new and improved device of this description. A large number of manufactured devices are made up in parts and these parts are then assembled to form the article. One of the objects of the present invention is to provide such an assembling device which permits the parts to be accurately, speedily and cheaply assembled.

The invention is illustrated in the accompanying drawings, wherein—

Fig. 2 is a sectional view taken on line 2—2 of Fig. 1;

Fig. 3 is a view of one of the gears formings a part of the driving mechanism;

Fig. 4 is a sectional view taken on line 4—4 of Fig. 2.

Like numerals refer to like parts throughout the several figures.

Figure 1:
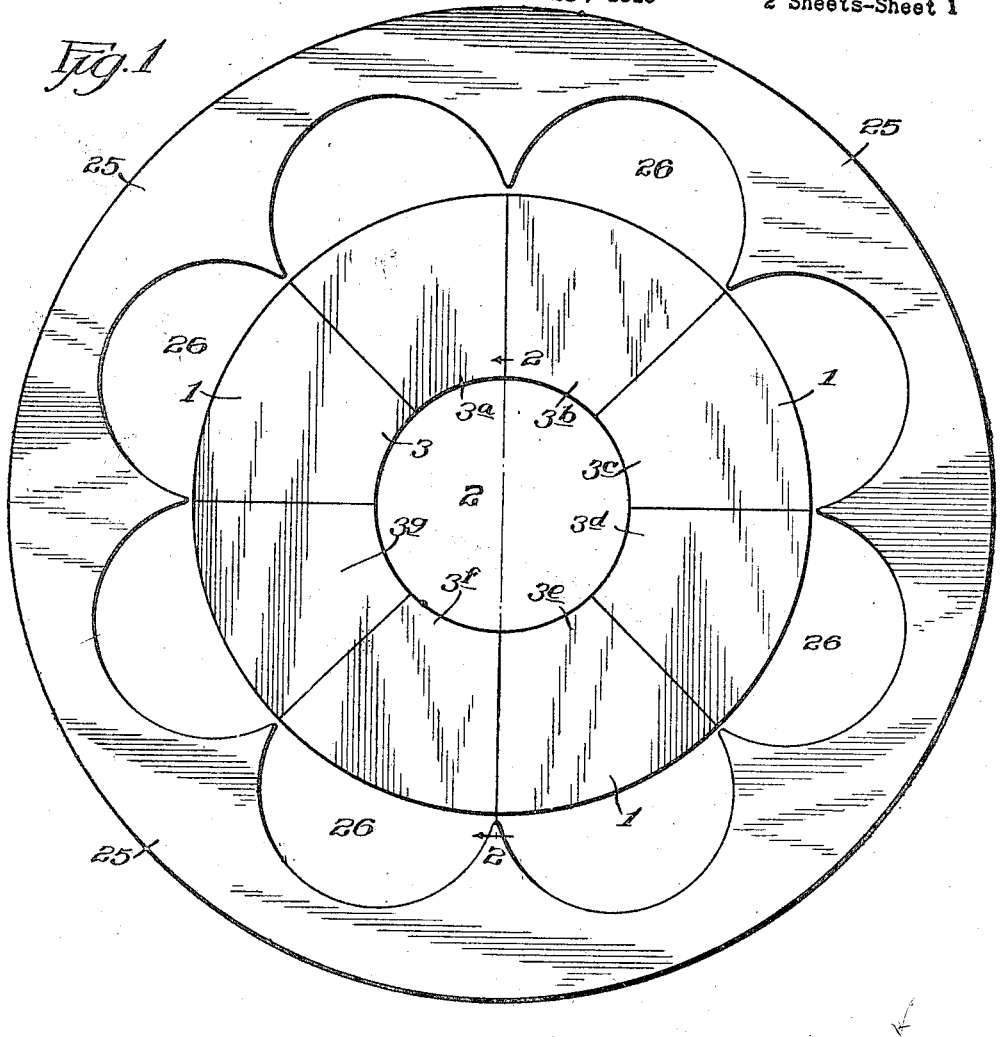
Fig. 1 is a plan view of one form of apparatus embodying the invention.

Referring now to the drawings it will be understood that this assembling apparatus may be used in connection with the assembling of articles of manufacturing of various kinds, and for purposes of illustration we have shown it in connection with the assembling of a child's rocking chair.

In the construction shown which illustrates one form of our invention we provide an assembling table 1, arranged to be moved at intervals. This table is preferably provided at the middle with an open space 2 and is divided into sections 3, $3^a$, $3^b$, $3^c$, $3^d$, $3^e$, $3^f$, $3^g$, etc. Any desired number of sections may be used, the number depending upon the number of operations it is desired to perform on the assembling apparatus. The table is rotatably mounted upon the supports 4, 5 and some suitable means is provided for intermittently moving it. In the construction shown the table is provided with a rack 6, which is engaged by a gear 7 mounted on a shaft 8. Connected with this gear is a pinion 9 which engages a control wheel 10. This control wheel is loosely mounted upon a shaft 11 operated by any desired means. As is herein illustrated this shaft is operated by a motor 12. This motor drives a shaft 13, there being a speed reducer 14 to reduce the speed the desired amount. We have illustrated the motor as an electric motor, but it is of course evident that any other motor may be used. It is also evident that any suitable speed reducing mechanism or gearing may be interposed between the motor and the control wheel 10. In the construction shown the shaft 13 has a bevel gear 15 which engages a bevel gear 16 on the shaft 11. Connected with the shaft 11 is an actuating part 17. In the construction shown this actuating part rotates with the shaft and is also free to move up and down. The control wheel 10 is provided at intervals with a series of engaging parts 18, the number of engaging parts depending upon the relation desired between the rotation of the control wheel and the rotation of the shaft 11. Ordinarily this number of engaging parts would depend upon the number of sections 3, $3^a$, etc., with which the table 1 is provided.

In proximity to the control wheel is a controlling member 19 which controls the actuating part 17. This controlling member consists of a device for moving the actuating part 17 at predetermined intervals so that it engages one of the engaging parts 18 on the control wheel 10. In the construction shown the controlling member consists of an upstanding part at least a portion of which is beveled as shown at $19^a$. This controlling part is mounted upon the support 20. We preferably provide a spring 21 for insuring the release of the actuating part from the engaging parts. In this construction when the motor is in operation the shaft 11 is continuously rotating at the desired speed, which in this instance will be a slow speed. The actuating part 17 also rotates with the shaft while the control wheel 10 normally is stationary. When the actuating part 17 during its rotation reaches the beveled part $19^a$ of the controlling member it rides upon this beveled part and is thus moved in a position to engage one of the engaging parts 18 on the control wheel. The further movement of the actuating part then moves the control wheel through the pinion 9, and the gear 7 moves the table 1, the movement being sufficient to move the table a distance equal to one section or any other predetermined distance desired. When the table has been moved a sufficient distance the actuating part 17 drops off of the controlling member 19, thus becoming released from the engaging part 18 with which it was engaged. This releases the control wheel which then remains stationary until the actuating part completes another revolution, whereupon it rides up on the controlling member, engages another engaging part 18 and moves the control wheel and table through another portion of their travel. It will thus be seen that by means of this construction the table is moved a predetermined distance, is then held stationary for a predetermined time, and is again moved a predetermined distance, the table thus having an intermittent movement. Some means is preferably provided for giving a signal, a predetermined time before each new movement of the table begins so that the operator if necessary can quicken his movements. As herein shown, this construction consists of a signaling device $19^d$ which may be a bell. This signaling device is connected in circuit, as shown in Figure 2, with one coil of a transformer $19^c$, and this circuit is connected to the shaft 11 and to the contact $19^b$, see Figure 4. As the arm 17 which is connected to the shaft 11 moves along the raised portion $19^a$, it engages the contact $19^b$ a little while before it drops off of the part 19. When it engages this contact the circuit is completed through the signaling device $19^d$, said circuit being traced from the coil of the transformer to the shaft 11, then through arm 17, and contact $19^b$ and the conductor, to the signaling device $19^b$. Operators are arranged around the outside of the table and some if desired in the space 2, and each of these parties have a particular part to perform in assembling the manufacturing article. When they perform their part the section of the table upon which they operate is then moved so that the next party or parties then perform their part, and this is continued until the article of manufacture completes its movement, whereupon the parts are all assembled and it is then removed from the table and the process begun over again.

When the device is used to assemble the child's rocking chair as herein illustrated, each section of the table is provided with an assembling frame 22 as illustrated in Fig. 2. It is of course evident that the various operators may perform their tasks in any desired order, but one method of assembling this chair may be as follows:

Starting with the section 3 of the table the two rockers are placed in position on this section. The table is then moved to its next position and the legs of the chair are then driven into the rockers. The table is then moved and the seat is put in position and clamped. The table is then again moved and the spindles or connecting pieces 23 are attached to the seat, the spindles having previously been connected with the ring or confining device. The table is again moved and the screws which connect the legs and the seat are then placed in position. The table is again moved and the foot board is nailed or otherwise fastened in position. We have set forth these steps simply for purposes of illustration in order that the operation of the device may be readily understood.

The construction of assembling frame 22 will of course depend upon the kind of manufactured product which is to be assembled. The one we have illustrated is for a particular kind of a rocking chair and is provided with supports 23 for the rockers and a support 24 for the seat, the two supports being connected together in such a manner as to facilitate the assembling of the various parts. We also prefer to provide an outer stationary section or table 25 having spaces 26 for the operators, these spaces being arranged so that the operators cannot follow the table 1 around as it moves. By this means each section of the table comes opposite each operator, stops opposite such operator, remains there a predetermined time so that the operator may accomplish the function which such operator is to perform, and then moves away to the next operator, presenting the next section to the operator first mentioned. The various pieces to be used by the operators may be placed upon the table 25 or may be brought upon trucks or may be placed within the reach of the operators in any other desired manner. The supports 4 and 5 are preferably continuous or arranged in some manner so as to act also as a protection to prevent the operators from coming into contact with any of the mechanism. While these supports may be made in any desired manner, if the table is heavy it may be desirable to provide rollers at the outer edge thereof. A simple construction consists in connecting to the top of the support 4 an angle iron 27, one angle of which projects along the edge of the table. The table may be provided with rollers 27' which run upon the other angle of said angle iron. These rollers of course may be omitted if desired and with light tables this may be desirable.

It will not often be desirable to have rollers on the support 5 because it is desired that the table shall stop quickly after the actuating part becomes disengaged from the engaging part, and this frictional connection with the support 5 assists in producing this result. In assembling the parts this result may be secured by friction or in any other manner. It will thus be seen that by means of this device each operator is given a specific and determined time to perform a particular function, and this function must be performed in that time because otherwise the table moves away to the next operator and it is then too late. The speed of the table is regulated so as to give each operator sufficient time for this function, and if they become experts the time may be lessened.

It will thus be seen that the assembling of the manufactured article may thus be efficiently and speedily done, thereby reducing the cost of assembling to a minimum.

We claim:—

1. An assembling apparatus for manufactured products comprising a centrally mounted rotatable table having a series of working sections adapted to be successively moved past predetermined points, and automatic means for moving said table a distance substantially equal to one of said sections and stopping it at a predetermined time in each new position so that automatic time limiting operations may be performed on said sections.

2. An assembling apparatus for manufactured products comprising a movable table divided into sections and about which the operators are placed, automatic means for intermittently moving said table so that each section is moved past all of the operators and remains stationary a predetermined time so that the part performed by the operator or operators opposite it may be accomplished the table then moving so that the sections move to the next position and means for preventing the operator from following the table around.

3. An assembling apparatus for manufactured products comprising a movable table divided into sections, a motor, a control wheel normally free from said motor, an actuating part operatively connected with said motor, means for intermittently connecting and disconnecting said operating part and said control wheel, and an operative connection between said control wheel and said table.

4. An assembling apparatus for manufactured products comprising a movable table divided into a series of sections, a control wheel in proximity to said table, an operative connection between said control wheel and said table, a shaft upon which said control wheel is loosely mounted, an actuating part connected with said shaft so as to rotate therewith and free to move laterally, a controlling member for moving said actuating part laterally at predetermined intervals, a series of engaging parts on said control wheel adapted to be engaged by said actuating part when it is moved laterally so that it moves the control wheel with it during such engagement, and means for releasing the actuating part from its associated engaging part after the wheel and the table have been moved a predetermined distance.

5. An assembling apparatus for manufactured products comprising a movable table divided into a series of sections, means for intermittently moving said table a distance substantially equal to one of said sections, an outer table for parts which are to be assembled, said outer table provided with open spaces opposite said sections for the operators.

6. An assembling apparatus for manufactured products comprising a movable table divided into a series of sections, a motor, an intermittently acting connection between said motor and said table whereby the table is moved intermittently, and an automatic signalling device for giving a signal a predetermined time before each movement of the table.

In testimony whereof, we affix our signatures this 10th day of December, 1919.

NELS JOLEEN.
JOHN BURKHARDT.